Figure 2:
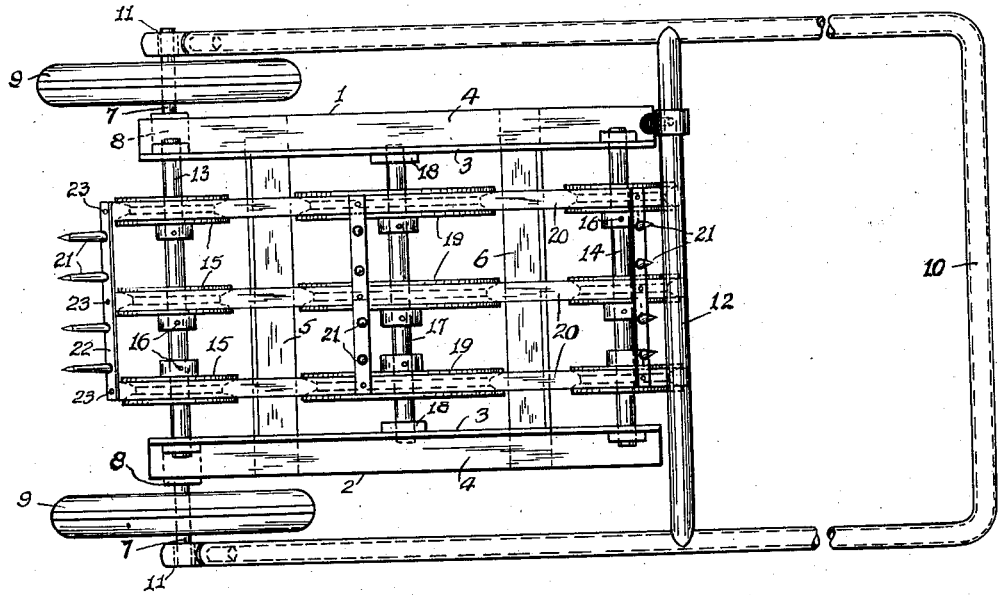

Sept. 2, 1958     J. E. MONTGOMERY, JR     2,849,939

LAND AERATOR

Filed June 29, 1955

INVENTOR.
JULIAN E. MONTGOMERY, JR.
BY
his ATTORNEY

# United States Patent Office 2,849,939
Patented Sept. 2, 1958

2,849,939

LAND AERATOR

Julian E. Montgomery, Jr., Shaker Heights, Ohio

Application June 29, 1955, Serial No. 518,837

1 Claim. (Cl. 97—46)

This invention relates to soil cultivators and more particularly to a device or tool for aerating the soil.

It is one of the objects of this invention to construct a soil aerating device which is light, sturdy of construction and which may easily be manipulated manually by the operator.

Another object of the invention is a device of this character which is provided with a plurality of spikes or soil puncturing members carried upon a floating type frame and movable along an endless path when the device is moved along a land surface and in contact therewith.

A further object of the invention is the provision of an aerating device of the type described having means whereby the spikes are caused to progressively penetrate the surface of the soil in a substantially vertical direction as the tool is moved along the ground until the major portion of the spikes is embedded in the soil, and then progressively effecting a withdrawal of the spikes from the soil as the tool continues its movement along the ground in such manner that the surface of the soil or lawn will be perforated without breaking up the adjacent soil around the perforations in chunks or lumps which would otherwise destroy the substantially flat areas over which the device is operated.

A still further object of the invention is a machine or device of this type which has a frame for carrying the perforating spikes in one or a plurality of endless paths and which is pivotally mounted at its forward end on an axis substantially in vertical alignment with the axis of the wheels on which the device travels, the rear portion of the frame being resiliently and floatingly suspended from the operating handle of the device.

Another object of the invention is a device of the above identified character having a floating perforator frame pivotally mounted to a carriage at one end and resiliently carried at its other end to permit the device to travel over rough surfaces, stones, branches or the like and to be immediately thereafter thrust back into engagement with the soil.

Another object of the invention is a soil aerator having one or more endless ground engaging spike carrying members operating over rotatable means whose axes are disposed in offset relation to each other, one axis of which is disposed below the plane of the other axes and below the frame carrying the said members.

Other objects and advantages of this invention will become more apparent as the following description of an embodiment thereof progresses, reference being made to the accompanying drawing in which like reference characters are employed to designate like parts throughout the same.

Figure 1:
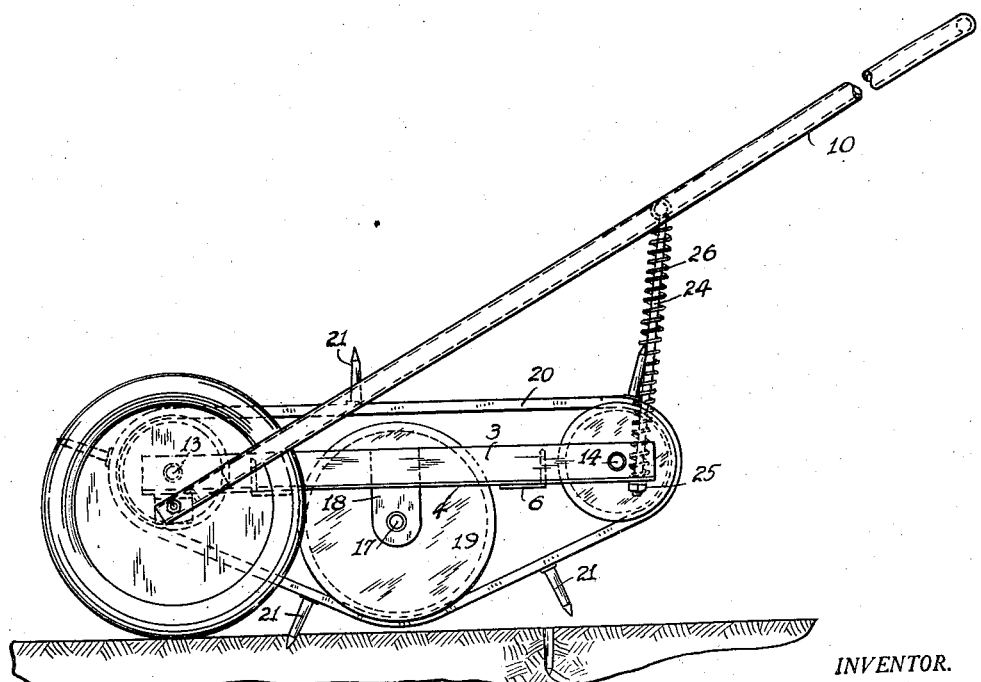

In the drawings:

Figure 1 is a side elevation of a ground aerating tool or device embodying my invention; and Figure 2 is a top plan view of the same.

In carrying out my invention, I have produced a soil aerator of light and sturdy construction which is adapted to be manually operated with extreme ease and effectiveness over the terrain to be aerated. According to this invention, the aerator device is characterized by the simplest structural features permitting substantially vertical ground penetration by and withdrawal of the spikes over rough and uneven terrain, thus insuring clean penetrations in the soil without chunking or heaving of the soil adjacent the penetrated areas.

Referring now more particularly to the drawings in which I have illustrated an embodiment of the invention, I provide an ambulant frame comprising a pair of oppositely disposed longitudinal side rails 1 and 2 which are preferably made of angle iron stock, the vertically disposed flanges of which are preferably inwardly of the frame body and the horizontal flanges extend outwardly as at 3 and 4, respectively.

Transverse frame members 5 and 6 are welded or otherwise fixed at their respective ends to the longitudinal rails 1 and 2, thus forming a light but rigid frame. A front axle shaft 7 is journaled near its opposite ends in the shaft supports 8, the ends extending outwardly to receive the wheels 9 and to pivotally support the lower respective ends of the U-shaped handle 10, as at 11. This handle 10 may be of tubular stock for lightness and is braced by a transverse member 12 extending across the handle and forming an integral part thereof. It is preferred that the member 12 be located above and slightly to the rear of the inner ends of the frame members 1 and 2.

The vertical flanges of the longitudinal frame members 1 and 2 rotatably carry at their opposite end portions the shafts 13 and 14, respectively, each of these shafts having one or more laterally spaced, grooved wheels or pulleys 15 adjustably positioned thereon as at 16 to rotate with the respective shafts 13 and 14.

Suspended below the frame and also below a horizontal plane passing through the axes of the shafts 13 and 14 is a transverse shaft 17 mounted for rotation in the bearing plates or brackets 18. This shaft 17 carries one or more grooved wheels or pulleys 19 adjustably fixed to rotate with the shaft 17. As illustrated in the drawing, where a plurality of pulleys are provided on each of the shafts 13, 14 and 17 they are disposed in serial alignment on those respective shafts.

Endless bands or belts 20 on which a plurality of ground penetrating spikes 21 are carried are provided to have driving engagement with serially aligned grooved pulleys on the shafts 13, 14 and 17. While I have shown the pulleys as having V grooves for receiving a V-belt, it is understood belts having flat or even round cross sections may be utilized with pulleys grooved to properly receive and drive the same.

The outwardly projecting spikes 21 are preferably fixed to the cross straps 22 in spaced relation which, in turn, are secured at 23 to each of the provided belts 20.

It is pointed out in particular that the grooved pulleys 19 are preferably of considerably larger diameter than that of the pulleys 15 and that the common axis of rotation of the pulleys 19 is disposed well below the axis of rotation of the pulleys 15 as well as the axis of the wheels 9. The effect of such structure is to provide a low center of gravity and to maintain the intermediate pulleys in close peripheral proximity with the surface over which the tool is moved.

Consequently, the endless bands 20 will be directed along downwardly inclnined paths from the forward pulleys to the pulleys 19 bringing the spikes into position for substantially vertical penetration position.

As the forward motion of the device progresses and the spikes approach a point tangent to the pulleys 15, the weight of the frame assembly will be directed to push the spikes into the soil.

As the spikes pass the tangent point, they will move along an upwardly inclined path toward the rear pulleys 15 and will, of course, be withdrawn from penetration in a substantially vertical direction. By such action the surface of the ground at the points of penetration is not unduly clumped or disturbed.

I have provided means by which the frame is supported in a sort of floating manner to pivot freely about the shaft 7 forwardly thereof. Such means illustrated in the embodiment shown may consist of a resilient connection between the handle cross member 12 and one of the frame side rails as at 1 and includes a rod 24 pivotally carried by the member 12 at its upper end, the lower end of the rod being slidable through an opening in the horizontal flange 4 of the rail 1 and threaded to receive a nut 25 below the flange 4. A compression spring 26 is carried by the rod 24, one end abutting the cross member 12 and the other end of the spring abutting the upper surface of the flange 4 of the rail 1. This spring functions to at all times exert a downward force upon the frame, thus maintaining the frame and consequently the spikes in the most efficient and advantageous position for proper penetration of the ground. It will be seen that even on rough, stony or littered terrain, the spring 26 will tend to maintain the spikes in proper position for penetration, while permitting the frame to swing in a counterclockwise direction as in Fig. 1 while passing over an obstruction and promptly to be thrust downwardly toward the ground again immediately after such passage under the compression of the spring 26.

Various changes may be made in the details of construction and arrangement of parts of the invention without departing from the spirit thereof or the scope of the appended claim.

I claim:

A ground aerator comprising a pair of supporting wheels, a floating frame pivotally carried on the turning axis of said wheels, a handle supported on said turning axis and extending rearwardly of the frame, ground penetrating means carried by the frame and comprising shafts rotatably mounted transversely of and at the forward and rearward ends, respectively, of said frame on axes lying in a plane above that of the turning axis of the wheels, laterally spaced and circumferentially disposed belt supporting wheels adjustably carried on each of said shafts, an intermediate shaft supported on said frame below said first shafts, belt supporting wheels of larger diameter than that of the belt supporting wheels carried by the forwardly and rearwardly mounted shafts spaced along and rotatable with said intermediate shaft in the frame and in longitudinal alignment with the first mentioned respective wheels, endless carriers on each of the series of aligned wheels, spike carrying members disposed transversely of and connecting the several carrier belts, said floating frame comprising a pair of longitudinal angle iron frame members and a pair of transverse frame members rigidly secured together, one of said longitudinal frame members having an opening at its rear end portion, a rod pivotally attached to said handle and having its lower free end inserted in and operating in said opening, and a coil spring on said rod normally exerting a downward thrust against said frame.

References Cited in the file of this patent
UNITED STATES PATENTS

| | | |
|---|---|---|
| 32,137 | Mann | Apr. 23, 1861 |
| 252,135 | Paddock | Jan. 10, 1882 |
| 2,050,739 | Sieverhropp | Aug. 11, 1936 |
| 2,231,821 | Sprouse | Feb. 11, 1941 |